(12) United States Patent  (10) Patent No.: US 7,717,010 B2
Bär et al.  (45) Date of Patent: May 18, 2010

(54) TRANSMISSION COMPRISING A DISPLACEABLE SHIFT FORK AND AN ACTUATOR

(75) Inventors: Andreas Bär, Lampertheim (DE); Günter Weber, Deutsch Kaltenbrunn (AT)

(73) Assignee: Magna Powertrain AG & Co KG, Lannach (AT)

( * ) Notice: Subject to any disclaimer, the term of this patent is extended or adjusted under 35 U.S.C. 154(b) by 677 days.

(21) Appl. No.: 10/587,690

(22) PCT Filed: Jan. 31, 2005

(86) PCT No.: PCT/AT2005/000028

§ 371 (c)(1),
(2), (4) Date: Jul. 27, 2006

(87) PCT Pub. No.: WO2005/073602

PCT Pub. Date: Aug. 11, 2005

(65) Prior Publication Data

US 2007/0163372 A1    Jul. 19, 2007

(30) Foreign Application Priority Data

Jan. 29, 2004   (AT) ............................... GM56/2004

(51) Int. Cl.
*B60K 20/00* (2006.01)
*F16H 63/32* (2006.01)
*F16H 59/04* (2006.01)
*F16H 61/00* (2006.01)
*F16H 63/00* (2006.01)
*F16H 59/00* (2006.01)

(52) U.S. Cl. .................... 74/473.37; 74/473.36; 74/335
(58) Field of Classification Search ............. 74/473.36, 74/473.37, 335; 192/94
See application file for complete search history.

(56) References Cited

U.S. PATENT DOCUMENTS 3,370,477 A * 2/1968 Lewis ......................... 74/337.5
4,070,914 A * 1/1978 Reinhardt et al. ........ 74/473.11

(Continued)

FOREIGN PATENT DOCUMENTS

EP       0 659 605 B1    6/1995

(Continued)

*Primary Examiner*—Thomas R Hannon
*Assistant Examiner*—Justin Krause
(74) *Attorney, Agent, or Firm*—Harness, Dickey & Pierce, P.L.C.

(57) ABSTRACT

The invention relates to a gearbox comprising a shift fork (4) that is displaced by an actuator using a shaft (2), whereby a rotational displacement of said shaft is translated into a displacement of the shift fork. To achieve an accurate displacement with minimum installation space, the gate (14) is configured on a sleeve (13) that is connected to the shift fork unit (4) in a rotationally fixed manner, said sleeve acting on the shift fork unit (4) in the direction of the displacement by means of a spring (24) and the shaft (2) runs through the sleeve (13), said shaft comprising a finger (11) that protrudes radially and co-operates with the gate. The shift fork unit (4) forms a housing (8) that surrounds the sleeve (13) and the spring accumulator (24) and that comprises bearing surfaces (34), by means of which the shift fork unit (4) is guided on the shaft (2) in the direction of the displacement.

19 Claims, 3 Drawing Sheets

U.S. PATENT DOCUMENTS

| | | | |
|---|---|---|---|
| 4,498,350 A | | 2/1985 | Ross et al. |
| 4,770,280 A | * | 9/1988 | Frost .................... 192/53.343 |
| 5,517,876 A | * | 5/1996 | Genise et al. ............ 74/473.24 |
| 6,349,608 B1 | * | 2/2002 | Lenzi ...................... 74/473.12 |
| 6,619,153 B2 | * | 9/2003 | Smith et al. .............. 74/473.37 |
| 6,802,794 B2 | * | 10/2004 | Showalter .................. 475/269 |
| 2002/0062706 A1 | * | 5/2002 | Baasch et al. ............ 74/473.36 |
| 2002/0139215 A1 | | 10/2002 | Smith et al. |

FOREIGN PATENT DOCUMENTS

JP  58-191354 A  11/1983

* cited by examiner

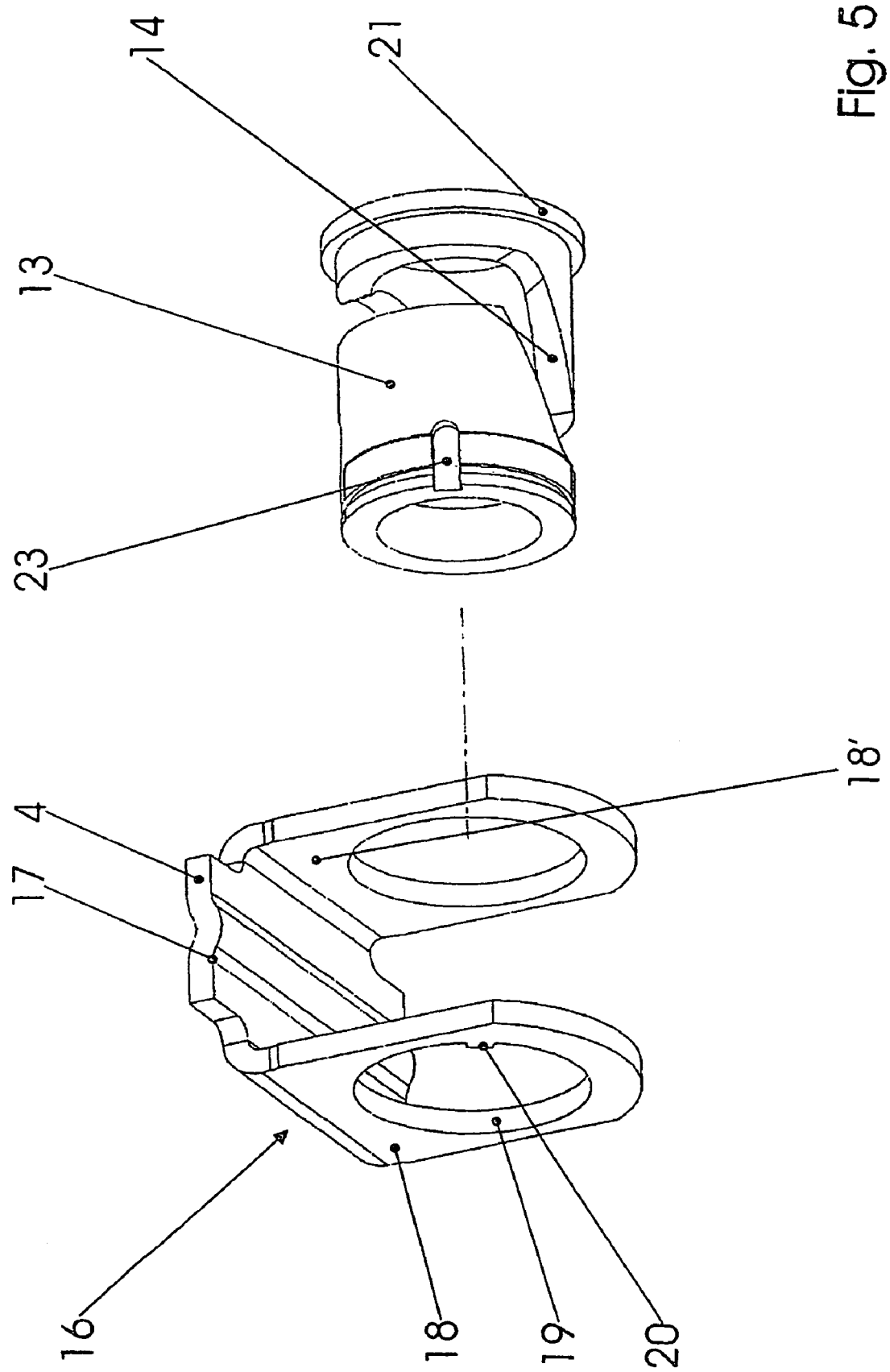

US 7,717,010 B2

TRANSMISSION COMPRISING A DISPLACEABLE SHIFT FORK AND AN ACTUATOR

CROSS-REFERENCE TO RELATED APPLICATIONS

This application is a National Stage of International Application No. PCT/AT2005/000028, filed Jan. 31, 2005, and which claims the benefit of Austrian Utility Model No. GM 56/2004, filed Jan. 29, 2004. The disclosures of the above applications are incorporated herein by reference.

FIELD

The invention relates to a transmission comprising a displaceable shift member by means of which the transmission can be shifted, wherein the shift member is displaceable by means of a shift fork moved by an actuator and the actuator has a motor, a shaft, a gate and a spring accumulator and wherein a rotational movement of the shaft is translated into a displacement of the shift fork by means of the gate. The shift member can be a part of a shaped-matched clutch, in particular a clutch sleeve or a synchronization unit, or can be another moving transmission member, in particular a planetary gear.

BACKGROUND

The statements in this section merely provide background information related to the present disclosure and may not constitute prior art.

Transmissions of this type are used inter alia in transfer cases of all-wheel drive motor vehicles to make available a road gear and an off-road gear.

A generic planetary gear is known from EP 659 605 B1.

The gate roller herein is driven by the shaft supporting it via a rotary spring. The latter serves as a force accumulator when the shape-matched clutch member does not immediately find the engaged position. This design is complex and makes it necessary to guide the shift fork on a rail in the displacement direction, which further enlarges the required construction space and results in a defective guiding. The angular position of the shift gate is never accurately determined; no abutment is present and the force with which the shift member is held engaged is not defined. The disconnection in the end position is also not reliable.

SUMMARY

It is therefore the object of the invention to improve a transmission comprising an actuator such that it is simpler, more reliable and more accurate with a minimum installation space.

It should establish a reproducible association of the angular position of the gate and the position of the shift fork and only yield on the exceeding of a specific actuation force.

This is achieved in accordance with the invention in that the gate is formed on a sleeve rotationally fixedly connected to the shift fork, with the sleeve acting on the shift fork via the spring accumulator in the direction of the displacement, and in that the shaft passes through the sleeve and has a radially projecting finger which cooperates with the gate. In this connection, a gate is to be understood as a substantially helical groove with guide surfaces to both sides of the finger which thus establishes the association of the rotation and the displacement in both directions of movement. Since the sleeve does not rotate with the gate and the gate is inwardly open, the finger can engage into the gate from the inside. Since the spring accumulator of the gate is downstream in the force flow, the association between the angle of rotation of the shaft of the actuator and of the displacement position of the sleeve is fixed.

The spring accumulator then only acts between the sleeve and the shift fork.

The spring accumulator comes into effect when the two clutch parts are, for example "out of mesh". The gate can then be displaced up to and into its end position without taking along the shift fork. When the shift member can then move, that is when, for example, the teeth of the clutch are slightly displaced with respect to one another, they are brought into engagement by the energy stored in the spring. It is also achieved with this arrangement that the force acting back on the electric motor is limited when shifting takes place at low revs or when one of the clutch members to be connected undergoes an increase in revs.

In an advantageous and particularly space-saving embodiment, the shift fork forms a housing surrounding the sleeve and the spring accumulator and having support surfaces by means of which the shift fork is guided on the shaft in the direction of the displacement. The housing protects the spring accumulator and simultaneously forms the guides on the rotating shaft which are relatively far away from one another. The fork shift is thereby accurately guided without an additional guide rail and the friction values are largely constant (no transition from static friction to sliding friction because the shaft is actually rotating).

In a further development of the invention, the sleeve is surrounded by a compression spring whose end windings cooperate with steps in the interior of the housing. This is only possible since the finger cooperating with the gate on the sleeve engages into the gate from the inside. A single spring can thus act as a spring accumulator in both displacement directions.

In a preferred embodiment, the sleeve is fixedly connected in the direction of rotation and displacement with a holding yoke, said holding yoke consisting of a guide part and of one respective wing at both sides, with the guide part being guided on guide surfaces extending in the longitudinal direction on the housing of the fork shift and the two parallel wings being fixedly connected to the end regions of the sleeve and the compression spring being accommodated between them. The holding yoke can be a simple sheet metal stamping. It establishes the rotationally fixed connection between the sleeve and the shift fork, thus hinders it from rotation and holds the spring without fully surrounding it.

The peripheral zones of the compression spring can thereby project beyond the wings in the radial direction, said peripheral zones cooperating with the steps in the housing. When the spring is furthermore pre-stressed between the wings of the holding yoke, the holding force is defined with which the shift member is held in engagement.

An advantageous detail consists of the fact that the fixed connection between the sleeve and the holding yoke is established in the peripheral direction by a nose engaging into a longitudinal groove and in the displacement direction by a collar and a spring ring. The whole unit of actuator/shift fork/spring accumulator can thus be installed and deinstalled simply without any special devices. A further detail improvement consists of the fact that the finger projecting radially from the shaft has a rotatably journaled roller at its end cooperating with the gate; the friction is thereby reduced, which permits an accurate and wear-free shifting.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a detail from FIG. 4 in another direction of view.

DETAILED DESCRIPTION

Figure 1:
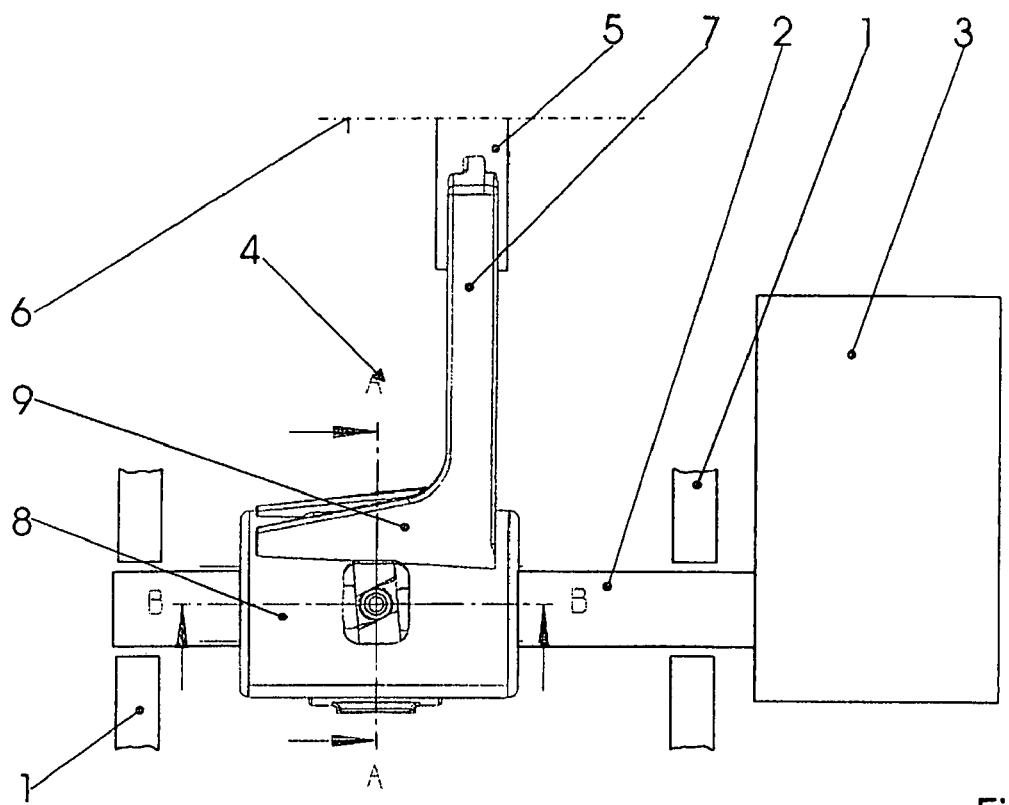
FIG. 1 is a partial longitudinal section through a transmission comprising the actuator in accordance with the invention.

The following description is merely exemplary in nature and is not intended to limit the present disclosure, application, or uses. It should be understood that throughout the drawings, corresponding reference numerals indicate like or corresponding parts and features.

In FIG. 1, the transmission housing is indicated by two wall parts 1 in which a shaft 2 is rotatably supported which is set into rotation by a geared motor 3. A shift fork unit 4 consisting of the actual shift fork 7 and a housing 8 is seated on the shaft 2. The shift fork unit 4 furthermore has reinforcement ribs 9 and is made integrally as a cast part or as an injection molded part. The shift fork 7 engages in a known manner around a shift member 5 which in turn rotates around an axis of rotation 6. This is also the axis of rotation of a transmission part (not shown) which cooperates with the shift member. The shift member can be a part of a shape-matched clutch, of a synchronization clutch or can itself be a toothed transmission member.

Figure 2:
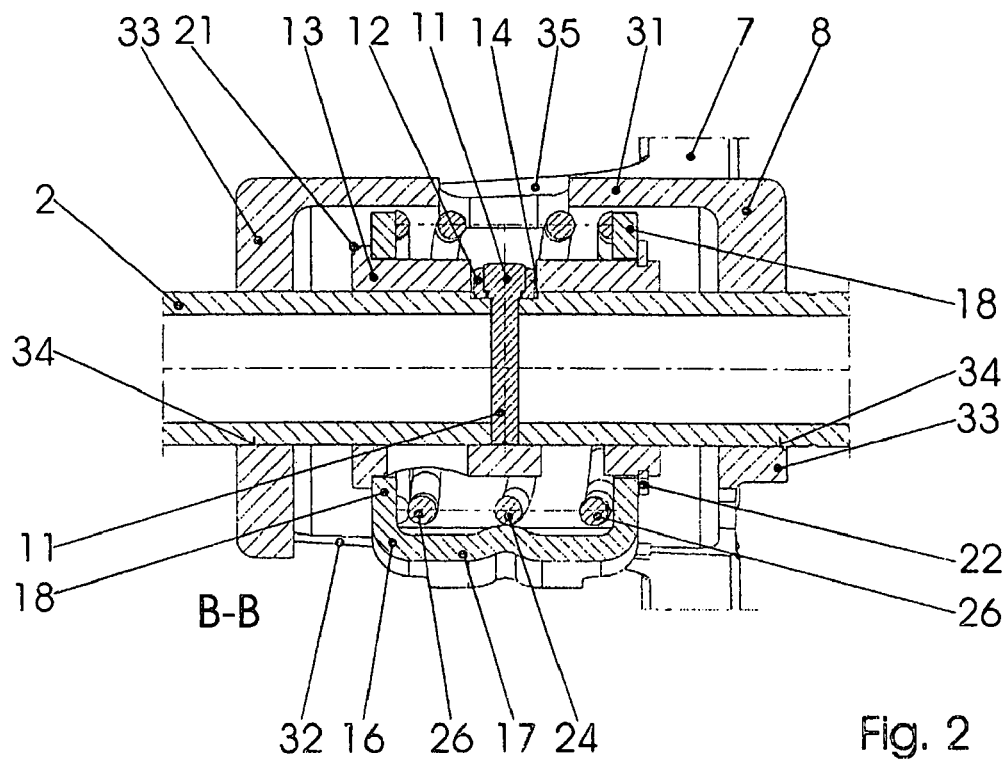
FIG. 2 is a longitudinal section according to BB, in FIG. 1.
Figure 3:
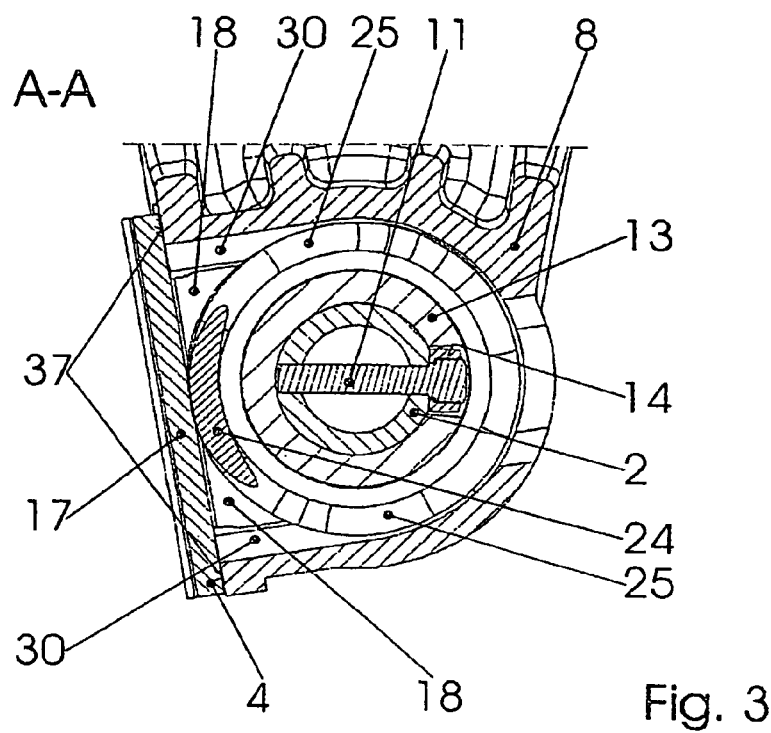
FIG. 3 is a cross-section according to AA, in FIG. 1.

The housing 8 of the shift fork can be seen in section in FIGS. 2 and 3. The shaft 2 is here a hollow shaft, for weight reduction, through which a finger or mandrel 11 passes which bears a roller 12 at its end projecting out of the shaft 2. The roller 12 engages into a gate 14 (see also FIGS. 5 and 6) which is substantially a helical groove in a sleeve 13. The sleeve 13 is not rotatable with respect to the housing 8, but the rotatable shaft 2 passes through it. The sleeve 13 is thus displaced in the longitudinal direction on rotation of the shaft 2.

The sleeve is fastened in a holding yoke 16 for security against rotation. The latter is a stamped part of sheet metal bent into a U shape. It consists of a central guide part 17 and parallel wings 18, 18' projecting at both sides at a right angle. They have circular holes 19 which accept the sleeve 13. An inwardly projecting nose 20, which engages into a groove 23 of the sleeve 13 (see FIG. 5), is in at least one hole 19 for the rotationally fixed connection. The sleeve 13 has a collar 21 in one end region and a spring ring 22 in another end region for the connection fixed against displacement. The guide part 17 of the holding yoke 16 is guided in a manner described further below at the housing 8 of the shift fork unit 4.

A compression spring 24 is clamped as a spring accumulator enveloping the sleeve 13 between the wings 18, 18'. It acts as a single spring thanks to its particular attachment in both directions and is pre-stressed, so that the holding force of the actuators on the shift member is determined. The winding diameter of the spring 24 is so large that its windings project beyond the wings 18, 18' of the holding yoke 16 in two peripheral zones 25 disposed opposite one another. The end windings 26 of the spring 24 can thus contact shoulders 30 unimpeded by the wings 18, 18' (see FIG. 3). A yielding displacement connection is thus established between the sleeve 13 and the shift fork unit 4. On engagement, for example, of a shape-matched clutch part, the spring 24 thus yields until the clutch parts have found one another.

The housing 8 of the shift fork unit 4 consists of an approximately cylindrical jacket surrounding only a part of the periphery and of two side walls 33 as base surfaces. The jacket leaves an opening 32 free at whose longitudinal rims guide surfaces 37 (see FIG. 3) are formed for the guide part 17 of the holding yoke 16. They form the displaceable security against rotation of the sleeve 13. An installation hole 35 is provided in the jacket 31 in the region disposed opposite to the opening 32. The side walls 33 for support surfaces which are supported on the shaft 1 and thus ensure a good guidance of the shift fork unit 4 on the shaft 2.

Figure 4:
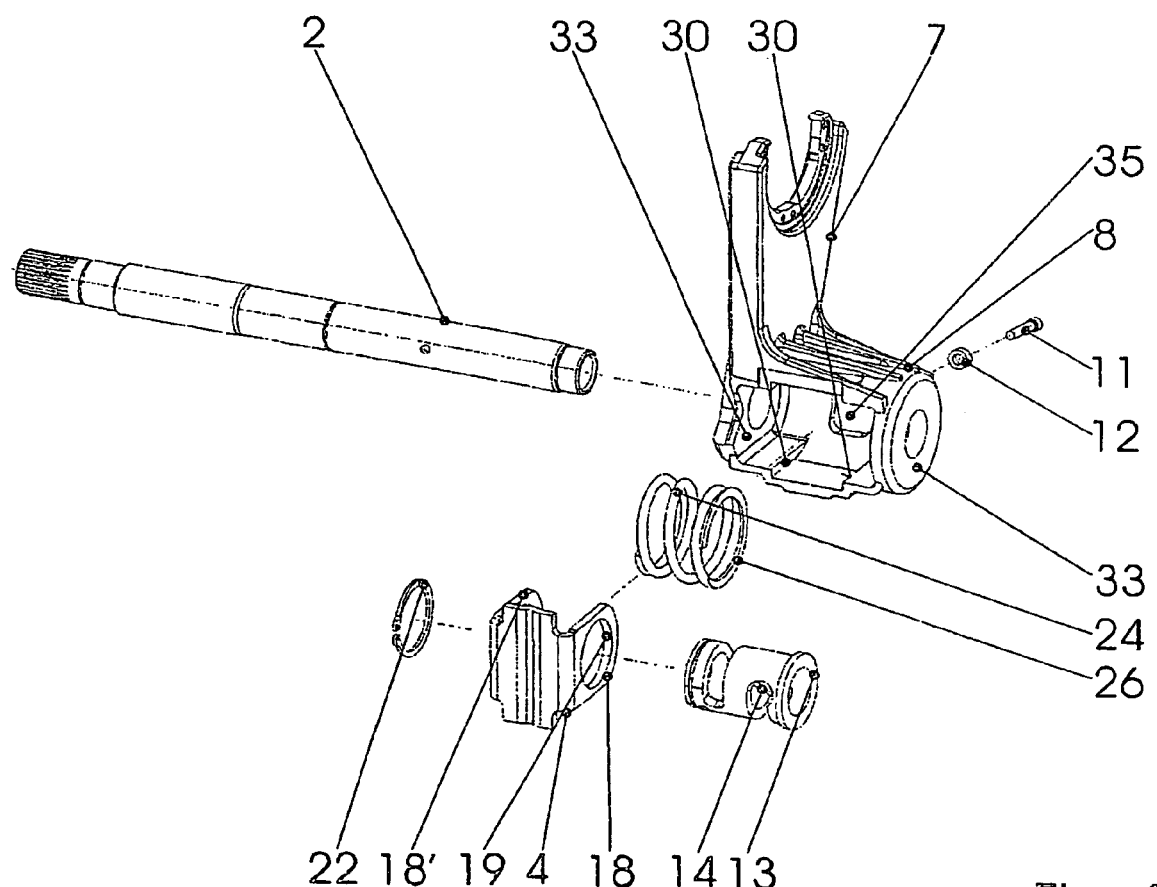
FIG. 4 is the actuator in accordance with the invention in axonometric projection and exploded.

It can be recognized with reference to FIG. 4 that the whole assembly can be installed easily. The spring 24 is first pre-stressed between the wings 18, 18' of the holding yoke and then the sleeve 13 is introduced into the holes 19 of the wings 18, 18' and fixed using the spring ring 22. This sub-assembly is then introduced through the opening 32 of the jacket 31 into the latter's interior.

In this process, the end windings 26 of the spring 24 contact the shoulders 30 in the housing. The shaft 2 can now be pushed through and the finger 11 can be inserted with the roller 12 through the installation opening 35 into the housing 8.

FIG. 5 finally shows the sleeve 13 and the holding yoke 16 and in particular the security against rotation by means of the nose 20 and the groove 23.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A transmission, comprising:
    a moveable shift fork;
    a shaft having a finger radially outwardly extending therefrom;
    a sleeve supported on the shaft and restricted from rotation, the sleeve including a groove in receipt of the finger such that rotation of the shaft causes axial translation of the sleeve; and
    a spring accumulator acted upon by the sleeve to transfer a load to the shift fork, wherein the finger radially extends through the spring accumulator.

2. The transmission of claim 1 wherein the shift fork includes an integrally formed housing in receipt of the sleeve and the spring accumulator.

3. The transmission of claim 2 wherein the spring accumulator includes a holding yoke restricted from rotating relative to the housing.

4. The transmission of claim 3 wherein the sleeve is restricted from rotating relative to the holding yoke.

5. The transmission of claim 4 wherein the spring accumulator includes a compression spring having opposite ends in engagement with the holding yoke.

6. The transmission of claim 5 wherein the opposite ends of the spring also engage portions of the housing.

7. The transmission of claim 6 wherein the holding yoke is fixed for axial movement with the sleeve.

8. The transmission of claim 7 wherein the holding yoke includes substantially parallel spaced apart wings each having an aperture in receipt of the sleeve.

9. The transmission of claim 7 further including a motor selectively driving the shaft.

10. A transmission, comprising:
an axially translatable shift member including a housing portion and a bifurcated fork portion adapted to engage a rotatable shifting element;
a rotatable shaft;
a radially extending finger fixed to the shaft;
a sleeve including a gate in receipt of the finger, wherein the sleeve surrounds the shaft and rotation of the shaft axially translates the sleeve;
a spring encompassing the sleeve; and
a holding yoke fixed to the sleeve to restrict rotation of the sleeve relative to the housing portion, the holding yoke having a pair of spaced apart wings, the spring being positioned between and in engagement with the wings, the spring including portions radially extending beyond the wings and in engagement with the housing portion.

11. The transmission of claim 10 wherein the spring is preloaded within the housing portion during an assembly process.

12. The transmission of claim 11 wherein the shaft extends through each of the sleeve, the spring, the holding yoke and the housing portion.

13. The transmission of claim 12 wherein the shaft is tubular, the finger transversely extends through the shaft and a roller is coupled to the finger and positioned within the gate.

14. A transmission, comprising:
a moveable shift fork including a housing;
a sleeve including a gate and being positioned within the housing;
a rotatable shaft including a radially extending finger being positioned within the gate such that rotation of the shaft axially translates the sleeve;
a holding yoke being fixedly connected to the sleeve and being guided by the housing, the holding yoke including spaced apart wings connected to end regions of the sleeve; and
a spring surrounding the sleeve and being positioned between the wings, the spring transferring load between the housing and the sleeve.

15. A transmission in accordance with claim 14 wherein the spring projects beyond the wings and cooperates with steps in the housing.

16. A transmission in accordance with claim 15 wherein the spring is pre-stressed.

17. A transmission in accordance with claim 14, wherein the finger extending radially from the shaft has a rotatably journaled roller at its end cooperating with the gate.

18. A transmission, comprising:
a moveable shift fork including a housing;
a sleeve including a gate and being positioned within the housing;
a rotatable shaft including a radially extending finger being positioned within the gate such that rotation of the shaft axially translates the sleeve;
a holding yoke being fixedly connected to the sleeve and being guided by the housing, the holding yoke including spaced apart wings; and
a spring surrounding the sleeve and being positioned between the wings, the spring transferring load between the housing and the sleeve, wherein the fixed connection between the sleeve and the holding yoke includes a nose of the holding yoke engaging a groove in the sleeve.

19. A transmission in accordance with claim 18, wherein the fixed connection between the sleeve and the holding yoke further includes a collar of the sleeve engaging one of the wings and a spring ring.

* * * * *